Sestrich

[15] 3,637,423
[45] Jan. 25, 1972

[54] PYROLYTIC DEPOSITION OF SILICON NITRIDE FILMS

[72] Inventor: Donald E. Sestrich, Monroeville, Pa.
[73] Assignee: Westinghouse Electric Corporation, Pittsburgh, Pa.
[22] Filed: Feb. 10, 1969
[21] Appl. No.: 798,056

[52] U.S. Cl. .................................. 117/106 R, 117/DIG. 12
[51] Int. Cl. ........................................................ C23c 11/14
[58] Field of Search .......................... 117/106, DIG. 12

[56] References Cited

UNITED STATES PATENTS 3,226,194  12/1965  Kuntz ................................. 117/106 X
3,485,666  12/1969  Sterling et al. ..................... 117/106 X
3,503,798  5/1970   Satoshi Yoshioka et al. ...... 117/106 X

*Primary Examiner*—Alfred L. Leavitt
*Assistant Examiner*—Wm. E. Ball
*Attorney*—F. Shapoe and C. L. Menzemer

[57] ABSTRACT

Silicon nitride films are prepared on graphite and other suitable substrates by the vapor phase pyrolysis of a silicon halide-ammonia adduct and preferably a silicon tetrafluoride-ammonia adduct ($SiF_4 \cdot 2NH_3$).

11 Claims, 2 Drawing Figures

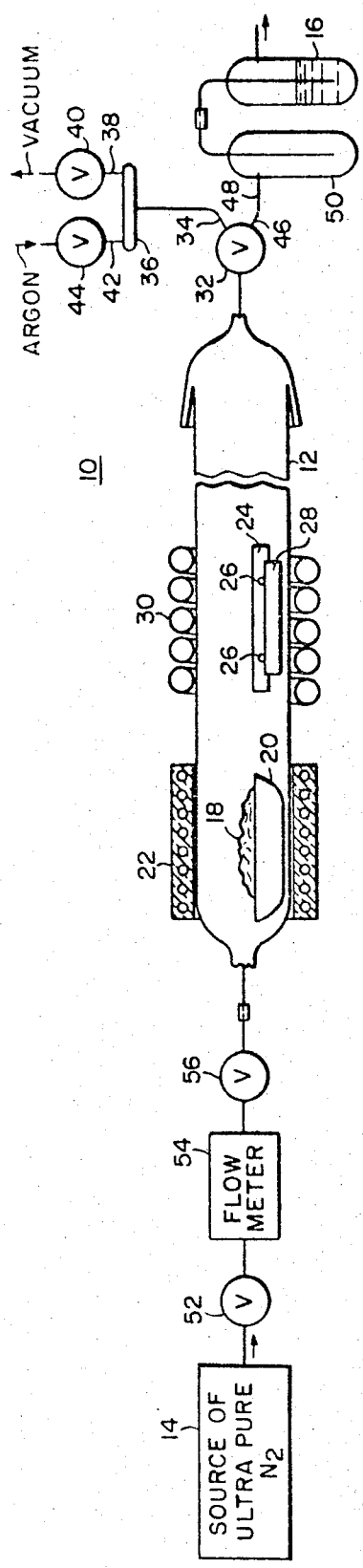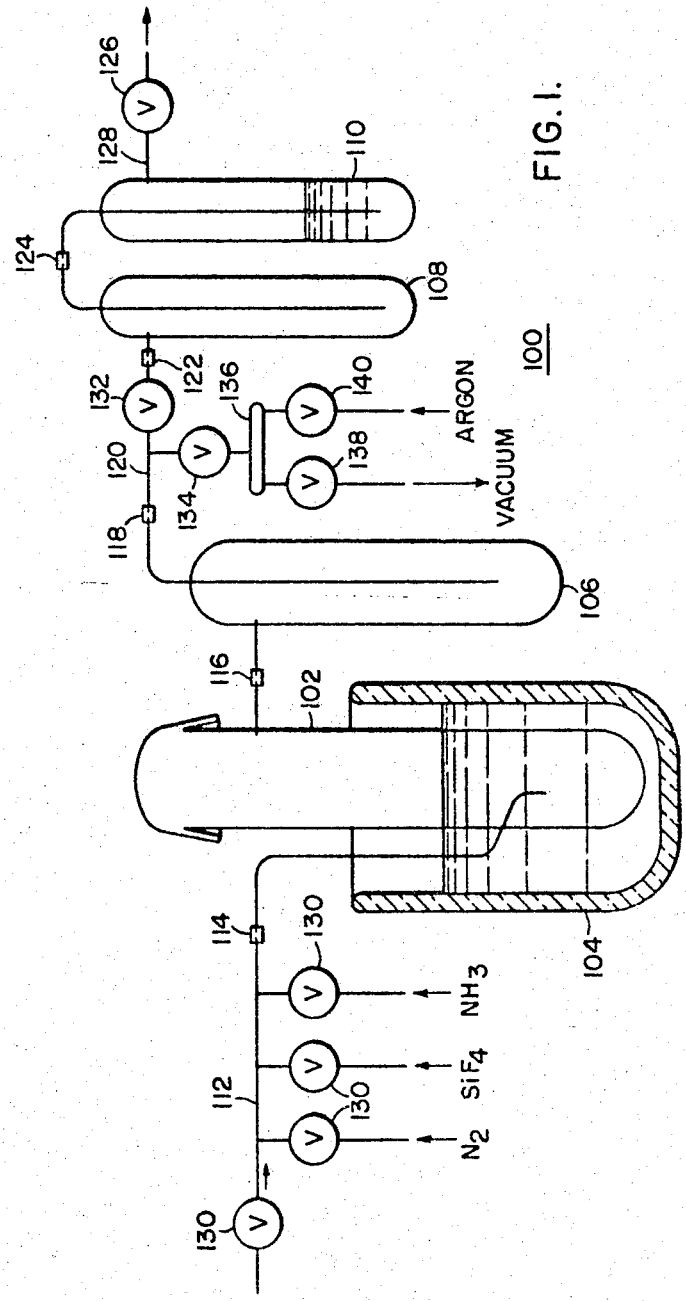
FIG. 1.
FIG. 2.
INVENTOR
Donald E. Sestrich 3,637,423

PYROLYTIC DEPOSITION OF SILICON NITRIDE FILMS

BACKGROUND OF THE INVENTION
1. Field of the Invention

This invention is related to the pyrolytic deposition of silicon nitride films on graphite and other suitable substrates.

2. Description of the Prior Art

Tungsten, molybdenum, and graphite are among the materials used in high temperature electrical applications because of their favorable physical and electrical properties. Their high melting points, high strength, and electrical conductivity at elevated temperatures, as well as their relatively low coefficients of thermal expansion, have made them useful as lamp filaments, furnace heating elements, and as electrodes or electrical contacts.

The use of tungsten, molybdenum, and graphite is limited to either a vacuum or an inert atmosphere environment since conductors made of any of these materials are subject to rapid oxidation in the presence of air or water vapor at high temperatures. Their utility could be greatly extended if an oxidation resistant coating could be developed which would serve as an electrical insulator as well as to protect the conductor from oxidation in air at high temperatures.

Silicon nitride ($Si_3N_4$) is an inert refractory material similar to a ceramic in electrical resistivity and oxidation resistance. Adherent films of silicon nitride on graphite or other suitable substrates would be useful as wire insulation or in the fabrication of capacitors and semiconductor devices.

Urban E. Kuntz in his U.S. Pat. No. 3,226,194 describes how a film of silicon nitride can be formed by the pyrolysis of a reactant gas mixture of a silicon halide and ammonia above the hot surface of a suitable substrate. The two principal drawbacks of this process are (1) one must always maintain a balance of the flow of reactant gases and their reactant gas mixture otherwise the silicon nitride which is formed will not deposit properly on the heated surface of the substrate, and (2) the impinging reactant gases can react anywhere within the apparatus and may even plug up this system thereby slowing down the deposition growth, forming an inferior quality silicon nitride film, or completely stopping the silicon nitride growth process.

An object of this invention is to grow silicon nitride material on substrates from a source consisting of a silicon halide-ammonia adduct.

Another object of this invention is to grow silicon nitride material on substrates from a source material of silicon tetrafluoride-ammonia adduct.

Other objects of the invention will, in part, be obvious and will, in part, appear hereinafter.

SUMMARY OF THE INVENTION

In accordance with the teachings of this invention, there is provided a process for growing silicon nitride on a substrate comprising the steps of disposing a silicon halide-ammonia adduct in one end of a reaction chamber; disposing a substrate at the opposite end of the same reaction chamber; evacuating the reaction chamber; causing a carrier gas to flow through the reaction chamber, first over and about the adduct and thence over and about the substrate; heating the substrate; and vaporizing the adduct whereby the carrier gas transports the vaporized adduct to the heated substrate, the silicon halide and ammonia of the adduct reacting in the presence of the heated substrate to produce silicon nitride which deposits on the heated substrate.

DRAWINGS

For a better understanding of the nature and objects of the invention, reference should be had to the following drawings in which:

FIG. 1 is a schematic of the reaction apparatus for the preparation of silicon tetrafluoride-ammonia adduct; and FIG. 2 is a schematic of a flow apparatus for vapor deposition of silicon nitride films on a substrate.

DESCRIPTION OF THE INVENTION

It is preferred that the starting material for the making of silicon nitride ($Si_3N_4$) in accordance with this invention be a solid material. The solid material should have stoichiometric, or almost stoichiometric, ratios of silicon and nitrogen. An excess of nitrogen is preferred in the compound if a stoichiometric ratio is not obtainable. A suitable solid material is an adduct of a silicon halide and ammonia, ($SiX_4 \cdot 2NH_3$).

The silicon halide-ammonia adduct materials upon standing in air react with the moisture in the air to yield $(NH_4)_2SiX_6$, $NH_4X$, $SiO_2$, and $NH_4X$, where X is either fluoride, chlorine, bromine, or iodine. The most unstable silicon halide-ammonia adduct materials in the presence of moisture in the air are silicon tetrabromide-ammonia and silicon tetraiodide-ammonia. These two adduct materials are quite unstable and react readily with the moisture of the air.

A more stable silicon halide-ammonia adduct material is silicon tetrachloride-ammonia. However, the reaction of the silicon tetrachloride-ammonia adduct and the moisture of the air still occurs too rapidly to make it a preferred starting material.

The most stable of the silicon halide-ammonia adduct materials is silicon tetrafluoride-ammonia adduct $SiF_4 \cdot 2NH_3$ and is the preferred solid material for the process of this invention. Silicon tetrafluoride-ammonia adduct material has an appreciable vapor pressure at reasonable temperatures, such, for example, as a vapor pressure of about 20 mm. Hg to 30 mm. Hg at a temperature of from 110° to 125° C. The silicon tetrafluoride-ammonia adduct has good stability and its preparation is quite easy. Silicon tetrafluoride reacts with ammonia and forms the stable 1:2 adduct material which does not react further with ammonia up to temperatures of at least 300° C. The adduct upon sublimation and recrystallization in a vacuum 115° C. produces pure $SiF_4 \cdot 2NH_3$ a solid starting material for making of silicon nitride films.

With reference to FIG. 1 there is shown apparatus 100 suitable for preparing silicon tetrafluoride-ammonia adduct material. The apparatus 100 is comprised of a first conduit 112 connected by a suitable gastight means 114 to a quartz reactor chamber 102 disposed in a flask 104 and having the capability of being evacuated. A suitable flask 104 into which the chamber 102 may be disposed is a Dewar Flask. The chamber 102 is connected by a gastight means 116 to a first trap 106. The first trap 106 is connected by a gastight means 118 to a second conduit 120 which in turn is connected by a gastight means 122 to a second trap 108. The second trap 108 is connected by a gastight means 124 to a mercury bubbler 110. A shutoff valve 126 in an outlet tube 128 from the mercury bubbler 110 regulates any gas flow from the bubbler 110.

The first conduit 112 has a plurality of shutoff valves 130 to regulate gas flows from a plurality of gas sources and to regulate a gas flow to and from the conduit 112 immediately before the gas sources. The second conduit 120 has a gate valve 132 to regulate any gas flow to the second trap 108, and a gate valve 134 regulating a gas flow to and from the conduit 120 to a third conduit 136. The third conduit 136 has a gate valve 138 regulating a gas flow to a vacuum producing means (not shown) and a gate valve 140 regulating a flow of a gas for purging the apparatus 100.

The apparatus 100 is evacuated and flushed with argon to purge the chamber 102 of air. Silicon tetrafluoride is disposed in the quartz reaction chamber 102. Liquid nitrogen is poured into the flask 104 and freezes the silicon tetrafluoride in the reaction chamber 102 at a temperature of −195.8° C.

The reaction chamber 102 is purged of any gaseous silicon tetrafluoride which may be present after freezing by use of ultrapure nitrogen gas. The ultrapure nitrogen gas employed in the process of this invention is a substantially oxygen and water free gas having an oxygen content of 0.9 molar parts per million and a water content of 0.53 molar parts per million. Anhydrous ammonia, in a sufficient amount in excess of that required for chemically reacting with the silicon tetrafluoride, and diluted only slightly with nitrogen gas remaining in the apparatus, is frozen on top of the frozen silicon tetrafluoride.

Through manipulation of the flask 104, the frozen silicon tetrafluoride and the frozen anhydrous ammonia are permitted to warm up and to react with each other in a controlled manner. The chemical reaction resulting in the formation of the adduct is accompanied by the evolution of a considerable amount of heat thereby causing rapid volatilization of the frozen components. This rapid volatilization of the frozen components produces the adduct $SiF_4 \cdot 2NH_3$ both by the gas phase in the reaction chamber 102 principally and by sublimation of the $SiF_4 \cdot 2NH_3$ material in the reaction chamber 102 resulting in the deposition of the adduct $SiF_4 \cdot 2NH_3$ in one or more traps 106 and 108 installed in the apparatus downstream from the reaction chamber.

Upon reaching room temperature, the apparatus 100 is opened and the silicon tetrafluoride-ammonia adduct $SiF_4 \cdot 2NH_3$, which is a solid white product, is removed. The adduct, as produced, is impure and possibly contains $(NH_4)_2SiF_6$, $NH_4F$ and $(NH_4)SiF_6 \cdot NH_4F$. The impure adduct is placed in apparatus suitable for the purification of the adduct by sublimation. The impure adduct is sublimed at a temperature of from 75° to 115° C. in a continuously pumped vacuum of at least 5 microns pressure. The purified $SiF_4 \cdot 2NH_3$ adduct is collected on split Pyrex sleeves placed in the sublimation apparatus.

Referring now to FIG. 2, there is shown apparatus 10 suitable for the vapor growth of silicon nitride ($Si_3N_4$) films on a suitable substrate material. The apparatus 10 is comprised of a reaction chamber 12, preferably of quartz, a source 14 of substantially oxygen and water free nitrogen, and a mercury bubbler 16 to prevent atmospheric contamination of the reaction products.

The purified silicon tetrafluoride-ammonia adduct 18 is placed in a boat 20 within one end of the chamber 12. The boat 20 is comprised of a suitable material, such, for example, as alumina. A suitable means 22 for heating the adduct 18 in the boat 20 is provided. Such suitable means 22 include a resistance heater placed outside the tube 12 in the vicinity of the boat 20.

Downstream from the adduct 18 material, but within the chamber 12, a suitable substrate 24 to grow the silicon nitride on is mounted on alumina rods 27 placed on an open ended alumina boat 28. Radiofrequency coils 30 are disposed about the outside of the reaction chamber 12 in the vicinity of the substrate 24 to heat the substrate 24 to a desired elevated temperature. The substrate 24 consists of a material selected from the group consisting of molybdenum, silicon, tungsten, tantalum, and graphite.

Downstream from the reaction chamber 12 is disposed a 3-way valve 32. Outlet 34 is connected to manifold 36 to enable one to evacuate the system of the apparatus 10 through line 38 and shutoff valve 40 or to flush the system with argon through line 42 and shutoff valve 44. Outlet 46 of the 3-way valve 32 is connected by line 48 to at least one trap 50 and the mercury bubbler 16.

The apparatus 10 is evacuated to at least 60 microns of pressure, and flushed with argon gas, other suitable gases for flushing the apparatus 10 are nitrogen and ammonia. This is repeated several times. The apparatus 10 is then purged further with a substantially water and oxygen free gas such, for example, as substantially water and oxygen free nitrogen gas, from the source 14 entering the chamber 12 through first a metering valve 52, thence through a flow meter 54 and a shut off valve 56. The substantially water and oxygen free gas is employed as a carrier gas. Other suitable carrier gases are substantially water and oxygen free argon and ammonia.

The flow of nitrogen gas is continued as the substrate 24 is started to be heated to an elevated temperature. The gas flow rate is from 100 to 250 cubic centimeters per minute, with a preferred gas flow rate of approximately 250 cubic centimeters per minute. The substrate 24 is heated to a temperature of from 850° to 1,385° C. When the substrate 24 has reached its desired elevated temperature, the heating of the source material 18 is commenced.

The source material is heated to a temperature of from 60° to 174° C. When the source material 18 has reached its operating temperature, the process is continued for the length of time required to grow the necessary thickness of silicon nitride on the substrate 24. When the process has continued for the necessary time, the heating means 22 is turned off first, allowing the source material 18 to cool first. The radiofrequency coils are then turned off and the coated substrate 24 is allowed to cool to room temperature in the stream of ultrapure nitrogen.

It is preferred, that when the substrate 24 is made of graphite, that the graphite substrate 24 be prebaked in a vacuum at a temperature in excess of 1,400° C. for a period of 1 hour.

The following examples illustrate the teachings of this invention:

EXAMPLE I

Silicon tetrafluoride-ammonia ($SiF_4 \cdot 2NH_3$) adduct was made by the method described in this invention. The reaction apparatus for producing the adduct was evacuated and flushed with argon gas 3 times. Approximately 25 cubic centimeters of $SiF_4$ was introduced into the reaction chamber and frozen at the temperature of liquid nitrogen by immersing the reaction chamber in liquid nitrogen in a Dewar Flask. The reaction apparatus was purged again with nitrogen gas which was a substantially water and oxygen free gas being used to remove any traces of gaseous $SiF_4$. Forty cubic centimeters of anhydrous ammonia, slightly diluted with the ultrapure nitrogen remaining in the system after purging, was frozen on top of the frozen $SiF_4$. The 40 cubic centimeters of anhydrous ammonia was sufficient to provide an excess of $NH_3$ for the later chemical reaction.

The Dewar Flask was manipulated to permit the $SiF_4$ and the $NH_3$ to warm up and to react with each other in a controlled manner. The adduct $SiF_4 \cdot 2NH_3$ was formed mainly in the reaction chamber although some was formed in the traps as well. Upon reaching room temperature, the apparatus was opened in air and the adduct removed.

The adduct $SiF_4 \cdot 2NH_3$ was transferred to a slightly inclined Pyrex glass tube, lined with split glass sleeves and sublimed at 82°±5 C. in a continuously pumped vacuum of 5 microns pressure for a period of 15 hours. Upon completion of the sublimation process it was found that 42.7 percent of the starting material remained as a residue. The analytical results for the sublimated adduct were as follows:

|  | % N | % Si | % F |
|---|---|---|---|
| Calculated for $SiF_4 \cdot 2NH_3$ | 20.28 | 20.34 | 55.04 |
| By chemical analysis | 19.1 | 20.1 | 56.1 |

X-ray analysis of the sublimated adduct generally agreed with the standard ASTM data and discrepancies noted are believed due to the use of cobalt radiation for the ASTM detection and the chromium radiation employed by the applicant which gives well dispersed longer wavelengths.

X-ray diffraction analysis of the residue of adduct showed the residue to contain $(NH_4)_2SiF_6$, unsublimed $SiF_4 \cdot 2NH_3$ and two phases not identifiable.

Approximately 3.0 to 3.5 grams of the sublimated adduct was placed in an alumina boat in the far end of the apparatus 10 as shown. The reaction chamber was 30mm. O.D. x 22 inches and was in series with a tank of ultrapure nitrogen gas and a mercury bubbler.

A graphite substrate was polished with 4/0 paper and was prebaked at 1,400°±25° C. for a period of 1 hour in a vacuum. The graphite substrate was mounted on alumina rods placed in holes drilled in the substrate and in turn was mounted on an open ended alumina boat at the position of the external coils of the radio frequency generator.

The system was evacuated to 60 micro torrs of mercury and flushed with argon three times. Substantially oxygen and water free nitrogen gas flowing at a gas flow rate of 250 cubic centimeters per minute for ½ hour purged the system. The substrate was heated to a temperature of 1,250°±25° C. The sublimed adduct SiF$_4$·2NH$_3$ was heated to 170°±5° C. Substantially oxygen and water free nitrogen gas flowing at a gas flow rate of 100 cubic centimeters per minute was first passed over the adduct and then over the heated substrate. The gas flow continued for 3 hours. The resistance heater was turned off first and removed thereby cooling the sublimated adduct. The RF generator was shut off and the substrate cooled. The nitrogen flow was maintained and the substrate cooled to room temperature. The apparatus was opened and the substrate removed for examination.

A transparent film of silicon nitride has been deposited on the substrate. The material was electrically insulating when tested with a resistance meter. The deposited film was found to be silicon nitride (Si$_3$N$_4$).

EXAMPLE II

The process of example I was followed except that the substrate temperature was 1,325°±25° C., the temperature of the adduct was 100°±5° C., the gas flow rate was 250 cubic centimeters per minute and the process was continued for 5 hours.

An insulating film as verified by a resistance meter had been grown on the substrate. The film was so adherent to the substrate that the substrate was partially destroyed to obtain the grown material for analysis. Analysis proved the material to be silicon nitride (Si$_3$N$_4$).

EXAMPLE III

The process of example I was followed except that the substrate comprised a molybdenum rod polished with 4/o polishing paper and washed in organic solvents, the substrate temperature was 1,150°±25° C., the adduct temperature was 93°±5 C., the gas flow rate was 250 cubic centimeters per minute and the process was continued for 6 hours.

An insulating film as verified by a resistance meter had been grown on the molybdenum substrate. The insulating film was analyzed and found to be silicon nitride (Si$_3$N$_4$).

Further analysis of the silicon nitride films grown by X-ray diffraction analysis techniques shows the adherent transparent films to be amorphous.

I claim as my invention:

1. A process for growing silicon nitride on a substrate comprising the steps of:
   a. disposing a silicon halide-ammonia adduct in one end of a reaction chamber;
   b. disposing a substrate at the opposite end of the same reaction chamber;
   c. evacuating the reaction chamber;
   d. causing a substantially oxygen and water free carrier gas to flow through the reaction chamber, first over and about the adduct and thence over and about the substrate;
   e. heating the substrate;
   f. vaporizing the adduct whereby the carrier gas transports the vaporized adduct to the heated substrate, the silicon halide and ammonia reacting in the presence of the heated substrate to produce silicon nitride which deposits on the heated substrate.

2. The process of claim 1 in which
   the substrate is a material selected from the group consisting of molybdenum, silicon, tungsten, tantalum, and graphite.

3. The process of claim 1 in which the carrier gas is a gas selected from the group consisting of nitrogen, argon and ammonia.

4. The process of claim 2 including the step of
   purging the reaction chamber with argon gas prior to causing the flow of the substantially oxygen and water free carrier gas through the reaction chamber.

5. The process as defined in claim 2 in which
   the silicon halide-ammonia adduct is silicon tetrafluoride-ammonia.

6. The process of claim 2 in which
   the substrate material is graphite and including
   the process step of baking the graphite substrate in a vacuum at a temperature in excess of 1,400° C. for a period of 1 hour prior to disposing the substrate in the reaction chamber.

7. The process as defined in claim 4 including the step of
   cooling the substrate with the silicon nitride deposited thereon in the carrier gas.

8. The process of claim 6 in which the silicon tetrafluoride-ammonia adduct is heated to a temperature of from 60° to 174° C. and the substrate is heated to a temperature of from 850° to 1,385° C.

9. The process of claim 7 in which
   the carrier gas has a gas flow rate of from 100 to 250 cubic centimeters per minute.

10. The process of claim 8 in which
    the carrier gas has a gas flow rate of 100 cubic centimeters per minute for at least the period of depositing silicon nitride on the heated substrate.

11. The process of claim 9 in which
    the carrier gas is nitrogen having a gas flow rate of 250 cubic centimeters per minute for at least the period of depositing silicon nitride on the heated substrate.

* * * * *